United States Patent [19]

Lindsay

[11] Patent Number: 5,366,193
[45] Date of Patent: Nov. 22, 1994

[54] DRAG/DAMPER DEVICE

[75] Inventor: Richard A. Lindsay, Eye, United Kingdom

[73] Assignee: Vinten Group plc, Buckinghamshire, United Kingdom

[21] Appl. No.: 961,930

[22] PCT Filed: Aug. 1, 1991

[86] PCT No.: PCT/GB91/01306
§ 371 Date: Jan. 13, 1993
§ 102(e) Date: Jan. 13, 1993

[87] PCT Pub. No.: WO92/03683
PCT Pub. Date: Mar. 5, 1992

[30] Foreign Application Priority Data

Aug. 21, 1990 [GB] United Kingdom ............... 9018312.0

[51] Int. Cl.⁵ ........................................... F16M 11/12
[52] U.S. Cl. ................... 248/183; 248/181; 354/81
[58] Field of Search ............ 248/183, 181, 185; 188/268, 271; 354/81, 293; 352/243

[56] References Cited

U.S. PATENT DOCUMENTS

| | | | |
|---|---|---|---|
| 3,123,330 | 3/1964 | Robinson | 248/183 |
| 3,353,776 | 11/1967 | Clemens | 248/183 |
| 3,552,699 | 1/1971 | Baker | 248/183 |
| 3,592,429 | 7/1971 | Miller | 248/183 X |
| 3,877,552 | 4/1975 | Higginson | 188/268 |
| 4,083,524 | 4/1978 | O'Connor | 188/271 |
| 4,113,215 | 9/1978 | Stapleton | 248/183 |
| 4,247,069 | 1/1981 | Kurz | 248/185 X |
| 4,886,230 | 12/1989 | Jones | 248/181 X |
| 4,955,568 | 9/1990 | O'Connor | 248/183 |
| 4,959,671 | 9/1990 | Ishikawa | 354/81 |

*Primary Examiner*—J. Franklin Foss
*Attorney, Agent, or Firm*—Kenyon & Kenyon

[57] ABSTRACT

A pan and tilt head for a TV or video camera mounting (10) comprises two drag/damper devices, one for controlling the pan movement and the other for controlling the tilt movement. Each device may comprise a fixed central shaft (18), a first set of spaced plates (22) secured to the shaft, a second set (24) secured to a rotatable housing (20), and a third set (26) interleaved between the first and second sets. When the plates are immersed in a viscous fluid and one member is moved, the characteristics are such that the forque increases linearly with speed from zero up to a given speed, and then remains substantially constant above the speed.

14 Claims, 2 Drawing Sheets

DRAG/DAMPER DEVICE

FIELD OF THE INVENTION

Invention relates to a drag/damper device for providing a coupling having a selected angular speed/torque characteristic between two relatively rotatable members. The invention is of particular application to TV/video camera mountings such as pan and tilt heads.

BACKGROUND OF THE INVENTION

Devices which produce drag or damping by means of either friction or viscous shear between relatively moving elements are known. The former typically comprise a friction clutch, attached to one element and contacting the relatively moving element under pressure, such that energy is dissipated by the resulting sliding contact. The magnitude of the damping force is dependent upon the friction contact pressure and is readily varied.

The torque/speed characteristic of a friction damper may be modified by the choice of friction materials and/or the provision of a fluid at the friction surface to provide boundary lubrication of the sliding contact in which case the damping force may rise with increasing speed from an initial stationary position and thereafter remain substantially constant irrespective of speed.

Viscous dampers typically comprise multiple interleaved plates alternately attached to each of the relatively moving elements, each plate being separated from adjacent plates by a small gap occupied by a viscous fluid. Relative movement of the plates causes viscous shear to take place in the fluid. The damping force generated, tends to increase substantially linearly with speed but at rest is zero.

One particular and important application of drag/damper devices is in pan and tilt heads for cameras, especially television cameras. In this application it is advantageous, to avoid "jerking" when making very slow camera movements from rest, for the torque to be substantially zero at near zero speed. On the other hand, for increasingly fast camera movements above a certain speed, it is advantageous for the torque not to become increasingly high.

In applications such as camera mounting, where the purpose of the damping device is to enhance the smoothness and control of manual movements, the following characteristics are therefore desirable:

1. The rate of change of the damping/speed relationship should tend to zero an high speed to permit relatively fast movements to be accomplished without unreasonable restraint, whilst providing adequate damping control at low speeds.
2. For fine control at the commencement of movement and during reversals, the unit should produce zero damping at rest and a high rate of change of damping with speed at low speeds.

It is a general object of this invention to provide a drag/damper unit which possesses these characteristics.

It is another object of the invention to provide an improved pan/tilt head for a camera mounting, which possesses the above characteristics.

Preferably the amplitude of any damping is variable.

It is a further object of the invention to produce a drag/damper unit (and/or a pan/tilt camera mounting head) in which the amplitude of damping is infinitely variable between limits.

THE INVENTION

According to one aspect of the invention a drag/damper device comprises in combination a friction damper in series with a viscous damper.

The invention thus refines the characteristics of a friction damper by the inclusion of viscous damping characteristics predominently at commencement and reversal of movement.

Preferably the viscous damper possesses a high rate of change of damping relative to speed.

Preferably the friction damper includes means for adjusting contact pressure between relatively moving parts (normally plates) within the friction damper.

According to one embodiment of the invention, there is provided a drag/damper device providing a coupling having a selected angular speed/torque characteristic between two relatively rotatable members, comprising a central shaft fixed to one member and a housing surrounding the shaft and fixed to the other member, the housing accommodating a first set of spaced plates fixed to the shaft, a second set of spaced plates fixed to the housing, a third set of spaced plates floatingly interleaved with the plates of the first and second sets, and a viscous fluid in which the plates are immersed in said housing, wherein the spacings between the plates of the first set and of the third set and the spacings between the plates of the second set and of the third set are chosen to provide a combined speed/torque characteristic wherein there is zero torque at rest, but which gives torque increasing substantially linearly with speed up to a given speed and provides substantially constant torque above said given speed.

The invention also lies in an improved pan/tilt head for a camera, embodying at least one drag/damper device constructed in accordance with the invention.

Preferably a pan/tilt head incorporates two such devices, one to control pan movement and one to control the tilt movement.

The essence of the invention is that the desirable characteristics of the two damper types are retained and the undesirable characteristics are masked. In the preferred embodiment, one unit, (defined by the coupling between the first and third sets of plates) is constructed so as to comprise predominantly a frictional damper, whilst the other unit, defined by the coupling between the second and third sets of plates, is constructed so as to predominantly comprise a viscous fluid damper. The individual speed/torque characteristics of the two units combine together to result in an overall characteristic in which torque is zero at zero speed (because the viscous fluid damping predominates at low speeds) but torque is substantially constant above a given speed (above which the frictional damping predominates).

It will be appreciated that the spacings between the plates must be selected having due regard to the material of which the plates are made and the properties of the viscous fluid in which the plates are immersed, and the desired properties of each plate-to-plate coupling.

It has been found that the plates of the first and second sets may be formed from metal (typically steel) and those of the third set may be formed from a plastics material such as PTFE, where a silicon grease is employed as the liquid.

A preferred embodiment comprises a first set of annular plates fixed to the central shaft and of outer radius $R_1$, a second set of annular plates fixed to the interior of the housing and of inner radius $R_2$ greater than $R_1$ and a third set of floating annular plates of inner radius $R_3$ and outer radius $R_4$, where $R_3$ is less than $R_1$ and $R_4$ is greater than $R_2$. The plates of the first set may be stepped down in thickness outwardly of a radius slightly less than $R_1$, and the plates of the second set may be stepped down in thickness inwardly of a radius slightly greater than $R_2$, so that the plates of the third set can be more compactly accommodated in interleaved relationship to the plates of both the first and second sets. The depths of the steps in the respective sets of plates can be chosen to give the required plate spacings between those of the third set and the first and second sets. Moreover, it will be appreciated that spacings between the plates of the first and second sets are only necessary at the zones where said plates are stepped down in thickness, and the term "spaced plates" used in the foregoing description is to be interpreted accordingly.

Whilst it is relatively difficult to vary the damping amplitude of a viscous damper, the amplitude of damping of a friction damper can be adjusted by varying the contact pressure between the plates. By clamping the plates forming the first set of plates so the contact pressure between these plates and those of the third set can be adjusted by varying the clamping force on those of the first set.

The invention thus also comprises a device in which the friction damper comprises a plurality of plates with means for adjusting a clamping force acting thereon so that the maximum torque value is readily adjustable between lower and upper limits.

Preferably the clamping force is obtained by a yoke acting axially on one end and a thrust plate at the other end of the plurality of plates.

The invention also lies in a pan/tilt head for a camera which includes at least one device as aforesaid to permit adjustment of the friction damping section thereof.

According to a further aspect of the invention in a drag/damper as aforesaid the transition from viscous damping to frictional damping can be smoothed out by providing different areas of overlap between the intermediate plates and those forming either the viscous damping device, or the friction damping device or both so that the points of transition between viscous and friction damping for each coupling pair is different from the others.

Preferably this is achieved in the preferred embodiment by progressively increasing the overlap between the intermediate plates and the outer plates from one end of the stack of plates to the other.

In a drag/damping device modified in accordance with this feature, the slip between outer and intermediate plates will be greater for those plate-pairs having smaller overlap than for the plate-pairs having greater overlap. In this way whilst speed is increased and transfer from viscous to frictional damping starts to occur for plate-pairs at one end (greatest overlap), the damping from plate-pairs at the other end (smaller overlap) will still be purely viscous. Until the speed has increased until the slip between all plate-pairs is governed by frictional damping alone, at each speed value some of the plate-pairs will exhibits viscous damping and the remainder frictional damping, the proportion of each changing with speed.

The invention also lies in a pan/tilt head for a camera which incorporates at least one modified drag/damping device as aforesaid.

The smoothing out effect is achieved by virtue of the fact that whilst the damping/drag introduced by each plate pair is determined by whether or not the speed has increased sufficiently to bring in the frictional damping, because the viscous and frictional damping arrangements are in series, the overall damping/drag characteristic is made up of the individual components of each of the plate-pairs, all in parallel. Where the overlap between the plates in each pair is the same, the individual contributions can De ignored, since they will all present the same damping characteristic - but where the overlapping areas vary -the overall damping effect will be determined by the number of pairs for which friction damping has replaced the viscous damping effect.

Typically the diameter of the intermediate plates (the third set) decrease in diameter so as to produce a 50% reduction in overlap between the intermediate plates and the outer set of plates, from top to bottom of the complete stack. However, it is to be understood that the invention is not limited to any particular change in overlap and any desired shape of characteristic may be obtained by providing an appropriate variation in the overlap from top to bottom of the stack.

The invention will now be described by way of example with reference to the accompanying drawings, in which.

Figure 1:
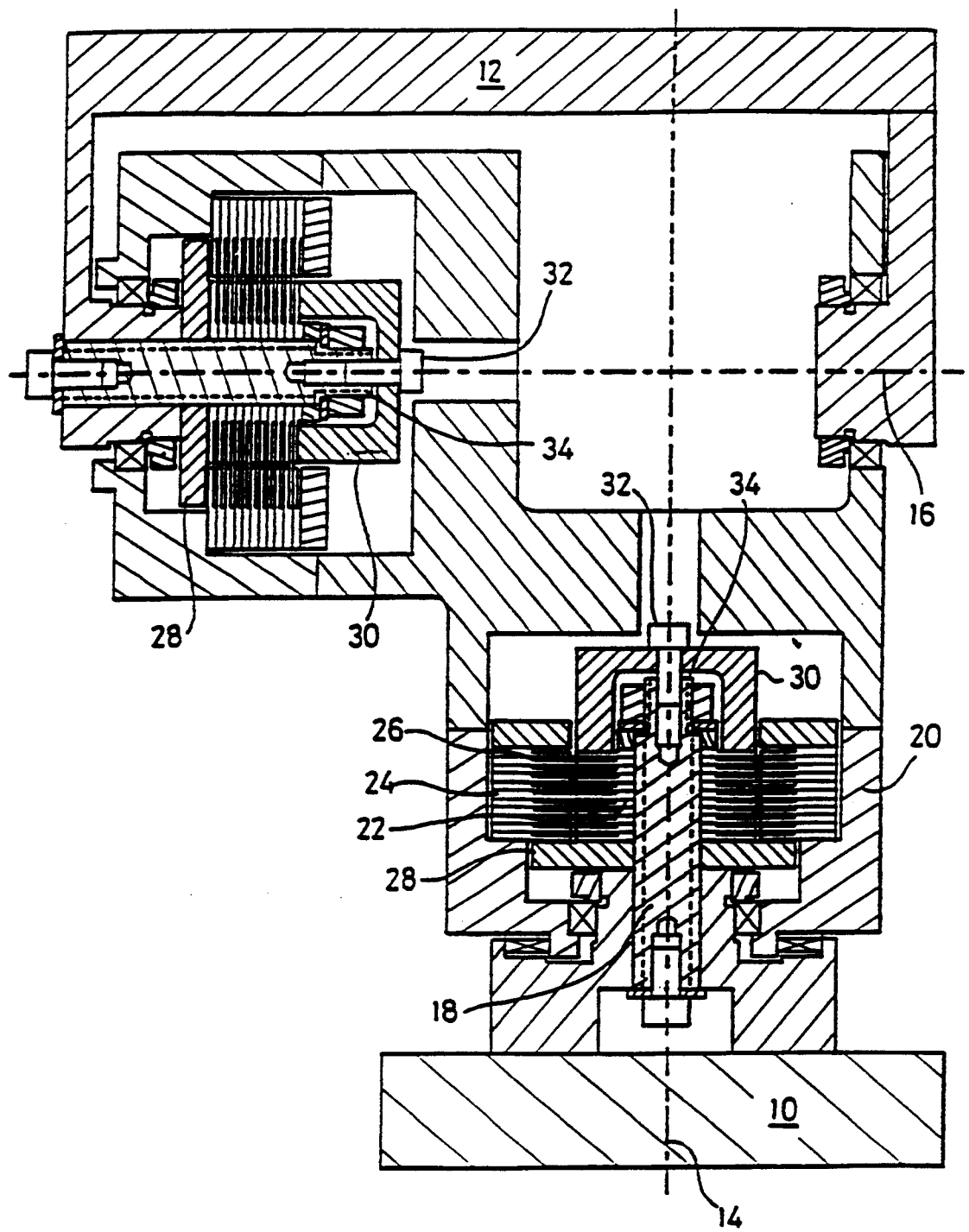
FIG. 1 shows a pan/tilt head for a camera embodying two drag/damper devices in accordance with the invention.

In the pan/tilt head illustrated in FIG. 1, reference 10 denotes the head mounting flange on a camera pedestal, 12 the camera mounting platform, 14 the pan axis and 16 the tilt axis. A drag/damper device in accordance with the invention is incorporated both on the pan axis 14 and on the tilt axis 16. The two devices are identical and only one will be described.

The drag/damper device has a central shaft 18 around which is rotatable a housing 20. The housing accommodates a first set of annular plates 22 fixed to the central shaft, a second set of annular plates 24 fixed to the housing, and a third set of annular plates 26 interleaved radially to overlap the plates of both the first and second sets. The plates are immersed within the housing in a suitable viscous oil.

Spacing between the plates 22 to accommodate the plates 26 of the third set is achieved by stepping said plates 22 down in thickness around a radially outer zone thereof. For the same reason, the plates 24 of the second set are stepped down in thickness around a radially inner zone thereof. The arrangement of the plates is more clearly shown in FIG. 2.

The plates 22 and 26 effectively constitute a first damper unit and the plates 24 and 26 effectively constitute a second damper unit in series with the first unit. The spacings between the plates 22 and 26 and the spacings between the plates 24 and 26 are chosen, by appropriate selection of the depths of the steps in the plates of the first and second sets, so that one damper unit is predominantly a frictional damper while the second damper unit is predominantly a viscous fluid damper. As shown the plates 22 and 26 form the frictional damper. In consequence, the complete drag/damper device has an angular-speed/torque characteristic which passes through zero, gives a torque increasing approximately linearly with speed up to a given speed value, and provides a substantially constant torque above the given speed.

The inner plates 22 are clamped between a thrust plate 28 and a yoke 30 and contact pressure between the plates 22 and 26 is varied by turning a threaded adjuster bolt 32 so as to screw it in or out of the internally threaded end 34 of the central shaft 18, in to increase, and out to decrease, the clamping force.

Figure 2:
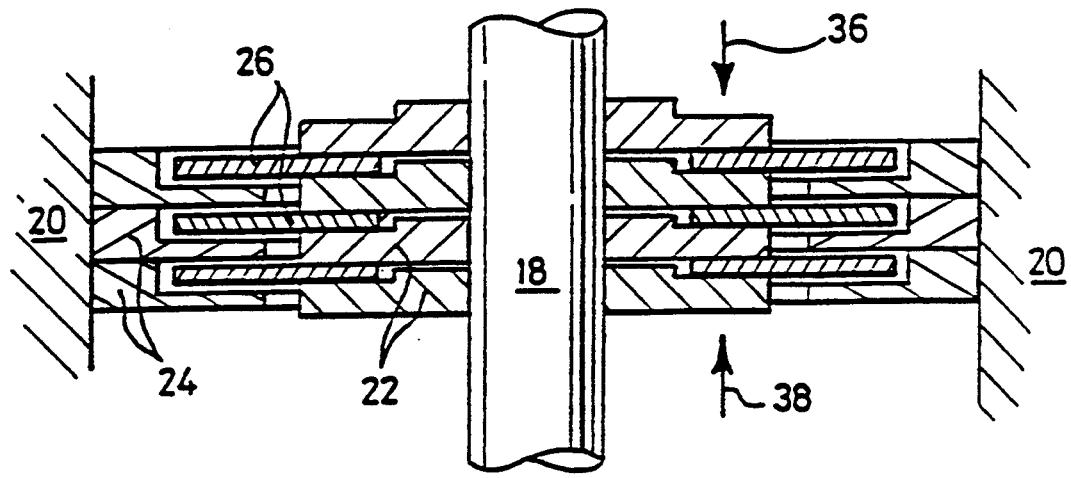
FIG. 2 shows part of a drag/damper device in diagrammatic enlargement.

The clamping force is denoted by the arrows 36, 38 in FIG. 2.

In order to ensure satisfactory operation and clamping, if the plates 22 are rigid, the thickness of the thicker (radially linnet) sections of the plates 22 is selected such that they are spaced by the plates 26 (see FIG. 2). If the stepped down sections of the plates 22 are resiliently deformable, this is not so essential.

Figure 3:
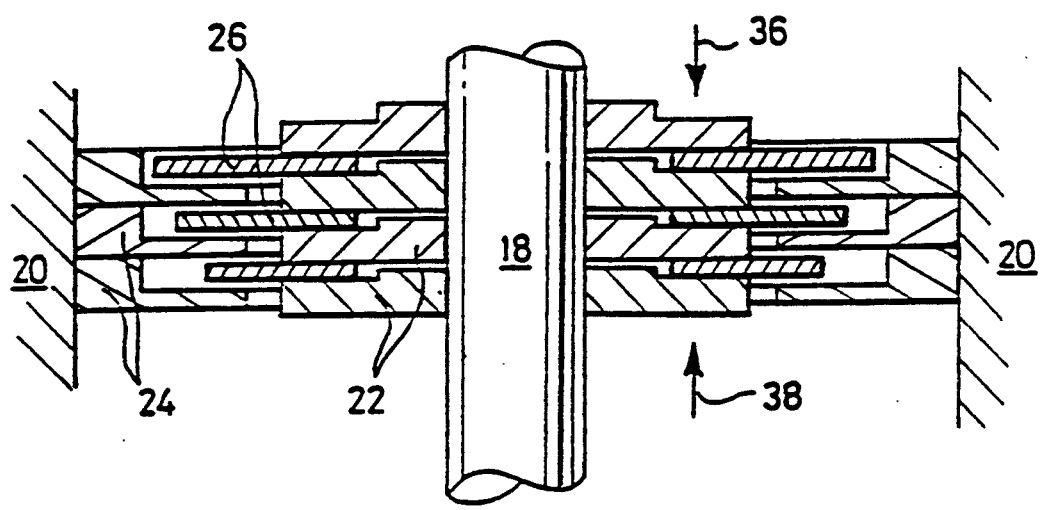
FIG. 3 shows a modified form of the device.

In FIG. 3 is shown a modification of the device of FIG. 2 in which the intermediate plates 26 progressively decrease in external diameter from top to bottom of the stack (of which only part is shown in FIGS. 2 and 3). This gives a smoother transition from viscous to frictional damping.

Various modifications of the above-described arrangement are possible within the scope of the invention as hereinbefore defined.

I claim:

1. A rotary damper comprising two torque resisting rotary damping devices coupled together in series, one of said rotary damping devices having an input, an output and a viscous fluid coupling to provide a resistance torque to relative rotation between the input and output which is zero when the relative speed between the input and output is zero and which rises generally linearly with relative speed between the input and output, the other rotary damping device having an input and an output and a torque resisting friction coupling which resists relative rotation between the input and output up to a certain torque above which the friction coupling allows slippage between the input and output with a substantially constant torque resistance whereby the two rotary damping devices provide a combined speed/torque characteristic in which resistance torque generated by the viscous coupling rises with speed to a certain level at which the resistance torque generated by the viscous coupling causes the friction coupling to slip whereafter the torque resistance offered by the damper remains substantially constant for higher speeds.

2. A rotary damper according to claim 1 in which the friction damper includes means for adjusting the contact pressure between relatively moving parts within the friction damper.

3. A rotary damper according to claim 1 and having a selected angular speed/torque characteristic between two relatively rotatable members, comprising a central shaft fixed to one member, a housing surrounding the shaft and fixed to the other member, the housing accommodating a first set of spaced plates fixed to the shaft, a second set of spaced plates fixed to the housing, a third set of spaced intermediate plates floatingly interleaved with the plates of the first and second set, and a viscous fluid in which the plates are immersed in said housing, the coupling between the first and third sets of plates being constructed so as to comprise predominantly the frictional damper, and the coupling between the second and third sets of plates being constructed as to the comprise predominantly the viscous damper, the spacing between the first and third sets and between the second and third sets being each chosen to provide a combined speed/torque characteristic wherein the torque is zero at rest, increasing substantially linearly with speed up to a given speed and being substantially constant above said given speed.

4. A rotary damper according to claim 3 in which the plates of the first and second sets are formed from metal, the plates of the third set are formed from a plastics material such a PTFE, and the viscous fluid is silicon grease.

5. A rotary damper according to claim 3 in which the sets of plates are all annular, the first set of plates fixed to the central shaft are of outer radius $R_1$, the second set of plates fixed to the interior of the housing are of inner radius $R_2$ greater than $R_1$, and the third set of floating plates are of inner radius $R_3$, and outer radius $R_4$, where $R_3$ is less than $R_1$ and $R_4$ is greater than $R_2$.

6. A rotary damper according to claim 5 in which the first set of plates are stepped down in thickness outwardly of a radius less than $R_1$, and the plates of the second set are stepped down in thickness inwardly of a radius greater than $R_2$, so that the plates of the third set can be more compactly accomodated in interleaved relationship to the plates of both the first and second sets.

7. A rotary damper according to claim 6 in which the spacings between the plates of the first and second sets are at the zones where said plates are stepped down in thickness.

8. A rotary damper according to claim 1 in which the friction damper comprises a plurality of plates with means for adjusting a clamping force acting thereon so that the maximum torque value is readily adjustable between lower and upper limits.

9. A rotary damper according to claim 8 in which the clamping force is obtained by a yoke acting axially on one end, and a thrust plate at the other end of the plurality of plates.

10. A rotary damper according to claim 3 in which the transition from viscous damping to frictional damping is smoothed out by providing different areas of overlap between the intermediate plates and those forming the viscous damping device or the friction damping device or both so that the points of transition between viscous and friction damping for each coupling pair is different from the others.

11. A rotary damper according to claim 1 in which the overlap between the intermediate plates and the outer plates increases from one end of the stack of plates to the other.

12. A rotary damper according to claim 10 in which the diameter of the intermediate plates decreases in diameter so as to produce substantially a 50% reduction in overlap between the intermediate plates and the outer set of plates, from tip to bottom of the complete stack.

13. A pan/tilt head for a camera, comprising at least one rotary damper in accordance with claim 1.

14. A pan/tilt head according to claim 13, comprising one rotary damper to control the pan movement, and one rotary damper to control the tilt movement.

* * * * *